(12) United States Patent
Gupta et al.

(10) Patent No.: US 10,366,010 B1
(45) Date of Patent: Jul. 30, 2019

(54) CACHE MEMORY DATA MANAGEMENT USING RELATIVE ACCESS FREQUENCY

(71) Applicant: Amazon Technologies, Inc., Seattle, WA (US)

(72) Inventors: Anand S. Gupta, Palo Alto, CA (US); Kerry Q. Lee, Seattle, WA (US); Varun Marupadi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/957,474

(22) Filed: Dec. 2, 2015

Related U.S. Application Data (63) Continuation of application No. 13/364,192, filed on Feb. 1, 2012, now Pat. No. 9,223,686.

(51) Int. Cl.
*G06F 12/0888* (2016.01)
*G06F 12/06* (2006.01)
*G06F 3/06* (2006.01)

(52) U.S. Cl.
CPC ........ *G06F 12/0888* (2013.01); *G06F 3/0604* (2013.01); *G06F 3/0647* (2013.01); *G06F 3/0653* (2013.01); *G06F 3/0679* (2013.01); *G06F 2212/1016* (2013.01); *G06F 2212/2022* (2013.01); *G06F 2212/60* (2013.01)

(58) Field of Classification Search
CPC .. G06F 12/0888; G06F 3/0604; G06F 3/0647; G06F 3/0653; G06F 3/0679; G06F 2212/2022; G06F 2212/1016; G06F 2212/60
See application file for complete search history.

(56) References Cited

U.S. PATENT DOCUMENTS

| | | | |
|---|---|---|---|
| 7,987,407 B2 | 7/2011 | Gille et al. | |
| 8,332,576 B2 | 12/2012 | Chu et al. | |
| 2005/0251628 A1 | 11/2005 | Jarvis et al. | |
| 2010/0287217 A1 | 11/2010 | Borchers et al. | |
| 2012/0239853 A1 | 9/2012 | Moshayedi | |
| 2012/0303861 A1 | 11/2012 | Benhase et al. | |
| 2013/0132638 A1* | 5/2013 | Horn | G06F 12/0871 711/103 |

* cited by examiner

*Primary Examiner* — Michael Alsip
(74) *Attorney, Agent, or Firm* — BakerHostetler (57) ABSTRACT

A caching system and methodology for data in a memory for faster access to commonly-used data by other applications and computer devices on a network. The memory can include a solid-state drive (SSD) array for the cache memory that has read-bias, in addition to a magnetic hard drive array. The system uses a logical set of slots to hold identifiers for specific groups of data that can be placed into cache memory and each identifier has a usage attribute that changes based upon the usage of the specific group of data and causes the identifier to move within the set of slots and potentially into cache memory.

20 Claims, 4 Drawing Sheets

CACHE MEMORY DATA MANAGEMENT USING RELATIVE ACCESS FREQUENCY

BACKGROUND

Networked computing solutions allow for decoupling of storage assets from data consuming real and virtual computer devices. The storage can be remotely located from the physical devices and are not limited by the performance parameters of the calling real or virtual device(s). In order to achieve acceptable storage densities and costs, most networked storage systems rely on magnetic disk arrays, such as hard-disk drives (HDDs) as a primary storage medium. Because HDDs struggle to keep up with throughput requirements in many applications, storage systems augment arrays of these devices with double data rate (DDR)-backed caching, improving performance for frequently or recently accessed items. Unfortunately, it is prohibitively costly to achieve even moderate storage densities with DDR, limiting caching to a relatively small proportion of the total solution capacity. Thus, storage performance can be highly variable as some data is accessed in cache high speed, while many requests miss the cache and incurs slower disk and storage reading.

The proliferation of multi-level cell NAND flash memory (MLC NAND) as a higher density, high performance storage medium can improve storage system performance. MLC NAND integrated in to Solid State Disks (SSDs) arrays can provide input performance two orders of magnitude or greater than HDDs while achieving storage densities an order of magnitude higher than DDR magnetic storage. However, SSDs are still expensive compared to HDDs making a full caching system of only SSD storage systems very costly.

DETAILED DESCRIPTION

In brief overview, the present disclosure provides a system and methodology for caching data in a look-aside cache, where the cached data being read by other computer devices and programming threads. The caching methodology includes generating an ordered list, such as hierarchical set of slots or other logical structure, and the ordered list includes at least a caching section, and a potential drop section. When the devices(s) that create or monitor the ordered list receive a request to access first data, if an identifier for the first data is not within the ordered list, in response to receiving the request to access first data, an identifier is placed into the ordered list in front of the potential drop section. However, if an identifier for the first data is within the ordered list, then in response to the request to access the first data, the identifier for the first data into the caching section is promoted such that the identifier for the first data is placed into the caching section to cause at least one other identifier in the caching section to be demoted from the caching section. The placement of the identifier causes, in response to a determination that the identifier for the first data has been promoted into the caching section, the first data to be stored in a solid state storage cache, and cause, in response to a determination that the identifier for the second data has been demoted from the caching section, the second data to be marked as removable from the solid state storage cache.

In one embodiment, the identifier for the first data can be promoted ahead of an adjacent identifier in response to the request to access the first data. And the ordered list can include a tail such that, in response to a determination that an identifier for second data has been demoted from the tail, the identifier for the second data is removed from the ordered list. Furthermore, the caching section can include a head and a tail and the identifier for the first data can be promoted into the head of the caching section, and identifiers are then demoted in the ordered list in response to promoting the identifier for the first data to the head of the ordered list.

Figure 1:
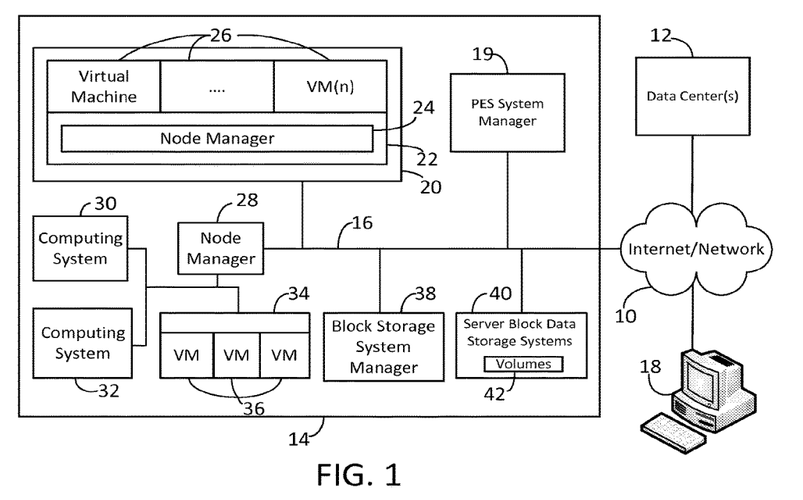
FIG. 1 is a network diagram illustrating one embodiment in which multiple computing systems execute programs and access reliable non-local block data storage.

FIG. 1 is a network diagram illustrating an exemplary embodiment in which multiple computing systems execute programs and access reliable networked non-local block data storage, such as under the control of a block data storage service and/or program execution service. In particular, in this example, a program execution service manages the execution of programs on various host computing systems located within a data center 14, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

Exemplary data center 14 also includes a computing system 38 that executes a Block Data Storage ("BDS") System Manager module for the block data storage service to assist in managing the availability of non-local block data storage to programs executing on computing nodes provided by the host computing systems located within the data center (or optionally on computing systems located in one or more other data centers 12, or other remote computing systems 18 external to the data center). In particular, in this example, the data center 14 includes one or more server block data storage systems 40, which each have local block storage for use in storing one or more volume copies 42. Access to the volume copies 42 is provided over the internal network(s) 16 to programs executing on computing nodes 20 and managed computer systems 30 and 32.

A BDS System Manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS System Manager module may coordinate with the Node Manager modules 24 and 28 to manage use of volumes by programs executing on associated computing nodes, while in other embodiments the Node Manager modules 24 and 28 may not be used to manage such volume use. In addition, in other embodiments, one or more BDS System Manager modules may be structured in other manners, such as to have multiple instances of the BDS System Manager executing in a single data center (e.g., to share the management of non-local block data storage by programs executing on the computing nodes provided by the host computing systems located within the data center), and/or such as to have at least some of the functionality of a BDS System Manager module being provided in a distributed manner by software executing on some or all of the server block data storage systems 40 (e.g., in a peer-to-peer manner, without any separate centralized BDS System Manager module on a computing system 38).

In this example, there can be various host computing systems such as host computer node 20, server block data storage systems 40, and computing systems 30 and 32 are interconnected via one or more internal networks 16 of the data center, which may include various networking devices (e.g., routers, switches, gateways, etc.) that are not shown. In addition, the internal networks 16 are connected to an external network 10 (e.g., the Internet or other public network) in this example, and the data center 14 may further include one or more optional devices (not shown) at the interconnect between the data center 14 and an external network 10 (e.g., network proxies, load balancers, network address translation devices, etc.). In this example, the data center 14 is connected via the external network 10 to one or more other data centers 12 that each may include some or all of the computing systems and storage systems illustrated with respect to data center 14, as well as other remote computing systems 18 external to the data center. The other computing systems 18 may be operated by various parties for various purposes, such as by the operator of the data center 14 or third parties (e.g., customers of the program execution service and/or of the block data storage service). In addition, one or more of the other computing systems 18 may be archival storage systems (e.g., as part of a remote network-accessible storage service) with which the block data storage service may interact, such as under control of one or more archival manager modules (not shown) that execute on the one or more other computing systems 18 or instead on one or more computing systems of the data center 14, as described in greater detail elsewhere.

Furthermore, while not illustrated here, in at least some embodiments, at least some of the server block data storage systems 40 may further be inter-connected with one or more other networks or other connection mediums, such as a high-bandwidth connection over which the server storage systems 40 may share volume data (e.g., for purposes of replicating copies of volumes and/or maintaining consistency between primary and mirror copies of volumes), with such a high-bandwidth connection not being available to the various host computing systems, such as computing systems 30 and 32 in at least some such embodiments. It should be appreciated that the example of FIG. 1 has been simplified for the purposes of explanation, and that the number and organization of host computing systems, server block data storage systems and other devices may be much larger than what is depicted in FIG. 1.

For example, as one illustrative embodiment, there may be approximately 4000 computing systems per data center, with at least some of those computing systems being host computing systems that may each host 15 virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

In this example, data center 14 includes one or more racks, and each rack includes a number of host computing systems such as computer node 20, as well as an optional rack support computing systems 22. The host computing nodes 20 on the rack each host one or more virtual machines 26 in this example, as well as a distinct Node Manager module 24 associated with the virtual machines on that host computing system to manage those virtual machines. One or more other host computing systems 34 also each host one or more virtual machines 36 in this example. Each virtual machine 36 may act as an independent computing node for executing one or more program copies (not shown) for a user (not shown), such as a customer of the program execution service. In addition, this exemplary data center 14 further includes additional host computing systems 30 and 32 that do not include distinct virtual machines, but may nonetheless each act as a computing node for one or more programs (not shown) being executed for a user.

In this example, a Node Manager module 28 executing on a computing system (not shown) distinct from the host computing systems 30 and 32 is associated with those host computing systems to manage the computing nodes provided by those host computing systems, such as in a manner similar to the Node Manager Module 24 for host computing node 20. A rack support computing system 22 may provide various utility services for other computing systems local to its rack (e.g., long-term program storage, metering and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system is also illustrated that executes a program execution system ("PES System") Manager module 19 for the program execution service to assist in managing the execution of programs on the computing nodes provided by the host computing systems located within the data center (or optionally on computing systems located in one or more other data centers 12, or other remote computing systems 18 external to the data center), the PES System Manager module 19 may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module 19 may coordinate with the Node Manager modules 24 and 28 to manage program execution on computing nodes associated with the Node Manager modules, while in other embodiments the Node Manager modules 24 and 28 may not assist in managing such execution of programs.

Data centers housing significant numbers of co-located interconnected computing systems have become commonplace, such as private data centers that are operated by and on behalf of a single organization, and public data centers that are operated by entities as businesses. Some public data center operators provide network access, power, and secure installation facilities for hardware owned by various customers, while other public data center operators provide "full service" facilities that also include hardware resources made available for use by their customers. However, any of the components for the network 10, devices supporting the network, storage, memory and the like could be physical located separately from each other, in multiple data centers, or spread about various computer devices.

In particular regard to virtualization technologies for commodity hardware, there are several existing systems that provide some benefits with respect to managing large-scale computing resources for many customers with diverse needs, allowing various computing resources to be efficiently and securely shared between multiple customers. For example, virtualization technologies such as those provided by XEN, VMWare, or User-Mode Linux may allow a single physical computing system to be shared among multiple users by providing each user with one or more virtual machines VM1-VMN hosted by the single physical computing system, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies provide virtual resources that span one or more physical resources, such as a single virtual machine with multiple virtual processors that actually spans multiple distinct physical computing systems.

Figure 2:
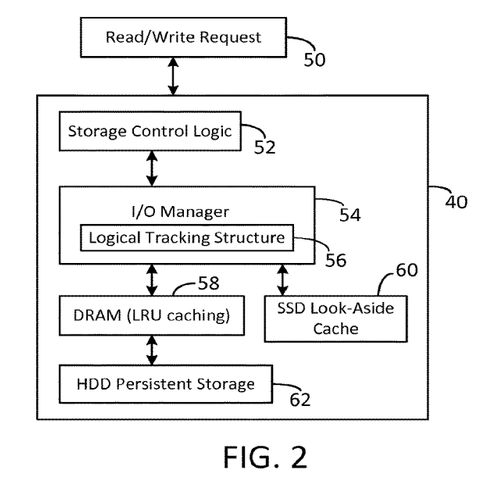
FIG. 2 is diagram of a caching system being implemented for read/writes to storage and the use of a master controller for implementing a caching methodology for a SSD look-aside cache.

FIG. 2 is diagram of a caching system being implemented in the server block data storage system 40 of FIG. 1. For read/writes to storage, as shown at block 50, the storage logic 52 interfaces with an I/O manager 54 that implements a caching methodology for a SSD look-aside cache, embodied herein as a hierarchical set of slots 56 (which is more fully shown and described in FIG. 3). The I/O manager 54 will control a DRAM cache 58 (such as a high speed HDD cache RAID array) for data for persistent storage, such as HDD persistent storage 62. In this embodiment, the DRAM 58 uses a common Least-Recently-Used (LRU) eviction policy, whereby the last data accessed is automatically cached and the data that has been in the cache longest without access is evicted and all data will pass through the cache. While this policy works very well in DDR-backed caches, with robust storage like HDDs, with SSDs an LRU policy incurs an excessive number of writes with all data that is accessed is written to the SSD at least once, regardless of subsequent use patterns. The aggressively dynamic nature of this policy would ultimately result in high turnover of SSDs in heavily used and multi-tenant network-based storage service caches.

However, the usage attribute of the identifier can be an LRU scheme as implemented thorough the identifier intake process to the hierarchical set of slots 56 as defined below and the rescuing of data soon to be dropped from the cache. Other usage attributes can be used for the identifier, such as the frequency of access in a given time period, the number of accesses by different calling applications, total number of hits, or combinations thereof.

In an example embodiment, the I/O manager 54 also controls when data is inserted, removed, and accessed from a SSD look-aside cache 60 for data that is highly read, such that a significant time advantage in the reading of the data from SSD memory is obtained. In this embodiment, the I/O manager 54 will route appropriate read requests to the SSD look-aside cache 60, and will also monitor the data usage and use, for example, a logical tracking structure 56 to determine when data should be placed into the SSD look-aside cache 60, the methodology of which is further described herein.

Figure 3:
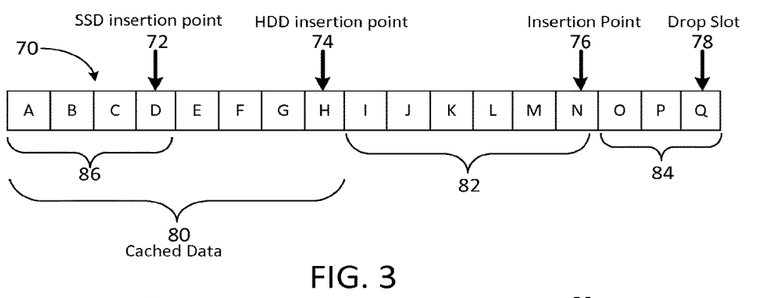
FIG. 3 is a diagram of a logical hierarchical structure of a set of slots that implements a caching methodology for data.

FIG. 3 is a diagram of the logical tracking structure 56 being a logical hierarchical structure of a set of slots 70 that implements one embodiment of a caching methodology in a multi-tiered cache for data, wherein data that is represented by identifiers as having increasing usage advances up the hierarchy and becomes ultimately inserted into an SSD array, such as SSD look-aside cache 60. The logical set of slots 70 is merely an abstract logical structure that is utilized to describe the caching methodology and can be implemented as any form of data structure, such as queues, cells, ordered lists or objects, as would be apparent to one of skill in the art. Moreover, it is preferable that the number of slots is fixed for a given set of resources, but a dynamic structure can be used should the resources also be dynamic (e.g. the cache memory increases) such that the structure size is optimal for the given amount of resources.

In an embodiment, the I/O manager 54 can use each slot, A-Q to hold at least an identifier for a specific group of data that is insertable into the SSD look-aside cache 60, with each identifier being associated with a usage attribute indicative of the amount of usage of the specific group of data by one or more clients, such as the one or more virtual machines 26 and/or computing systems 30 and 32. An identifier could be a simple tuple with location information for data and a numeric increment for usage, or a hash value of the data, or in some instances, can be relational to the data it identifies, such as a portion of an operating system, a song or movie. In addition, in an exemplary embodiment, the identifier can be associated with information that identifies the customer account the data is associated with. As will be described in more detail in the following paragraphs, the customer account information can be used by I/O manager 54 in addition to the usage attribute to determine where to place identifier in the logical set of slots 70. The identifiers being held within the logical set of slots 70 will thus identify a monitored set of data that, at a minimum, can be moved from the long term HDD storage into the SSD look-aside cache 60.

In an embodiment, the I/O manager 54 can use the set of slots 70 and the identifiers to track the frequency of access (or calls) for data across a storage, like the storage offered by block data storage systems 40. For example, the ordering of identifiers can be correlated to the frequency that data is accessed, with infrequently accessed data having its identifier near the tail, i.e. slot Q and frequently accessed data having its identifier near the head, i.e. slot A. In an example configuration when the set of slots 70 is full, each time a read or write operation directed to section of data, e.g., a block or an extent, an identifier associated with the data can be promoted toward the head and this in turn can cause one or more other identifiers to be demoted toward the tail. This implicitly normalizes number of accesses against peer accesses for data groups. The ordering is thus one of relative access frequency where one identifier precedes another if it was accessed and its peer was not accessed in a competitive fashion. This eliminates the need to normalize access counts against the time separating accesses, as is commonly done with aging policies for cached items. The insertion behavior described herein also serves to normalize the number of accesses against the number of opportunities for access. In an exemplary embodiment, new identifiers can be inserted ahead of the tail (third set of slots 84) because they have had more hits per opportunity, e.g. one hit moves them to the insertion slot, than peers within the recent past, e.g. one hit in the other slots can only move the identifier forward one slot at a time.

As shown in FIG. 3, in one embodiment, without restriction on identifier entry to the set of slots 70, the existence of the slot drop point 78 serves to automatically threshold the set of slots 70, removing identifiers for data that are overall unlikely to reach the cache. By gating cache utilization by access frequency as the usage attribute, data is only promoted to the SSD look-aside cache 60 when it is likely to remain in the cache, thereby reducing the movement of data in and out of the SSD look-aside cache 60. This in turn reduces the number of writes to SSD media and corresponding failure rate of SSD devices. Control over this gating can be manipulated by varying the location of one or more of the SSD insertion point 72, HDD insertion point 74, and insertion point 76, as having the insertion point 76 closer to one or both of the cache points (HDD array insertion point 74 and SSD insertion point 72) reduces the number of accesses necessary for promotion. This increases the cache adaptability while increasing churn of elements in and out of cache. Thus, insertion point regulation can be done dynamically as the need presents, for example, to increase the certainty of important data residing in cache.

In the illustrated embodiment, the logical set of slots 70 includes a first designated subset of slots 80 that the I/O manager 54 can use to hold identifiers for data that has been cached in cache memory, a second designated subset of slots 82 the I/O manager 54 can use hold identifiers for data that is insertable into cache memory, and a third designated subset of slots 84 to selectively hold identifiers that are potentially removed from the logical set of slots 70. At least one of the slots of the logical set 70 is designated as the insertion point 76 (shown here as slot N) for an identifier into the logical set 70, and at least one of the slots is designated as the HDD cache insertion point 74 (shown here as slot H) such that upon an identifier being placed within that slot, the specific group of data associated with that identifier is inserted into HDD cache memory, which here could be the high-speed HDD array of storage illustrated in FIG. 2. At least one of the slots of the logical set 70 is also designated as the drop slot 78 (shown here as slot Q) for potential removal of an identifier from the logical set 70 such that once the identifier is dropped from the drop slot 78, it is no longer monitored.

In operation, upon the usage attribute of an identifier reaching a predetermined threshold, such as a set hit frequency or a hit frequency that is greater than the hit frequency of other identifiers in the logical set 70, that identifier is placed within the logical set of slots 70 at the insertion point 76, and the identifier is selectively moved within the logical set of slots 70 based upon the usage attribute of that identifier in comparison with the usage attribute of other identifiers within the logical set. As the set of slots 70 is illustrated as hierarchical from Q up to A, for example (as further described herein) if a first identifier is in slot G and the usage attribute increases over that of a second identifier in slot F (e.g., in response to a read request for the data associated with the first identifier), then the first identifier in slot G will move to slot F and the second identifier will then move to slot G. In the example where a read request was received, the data for the usage attribute can be obtained by the I/O manager 54, from another computer device, such as DRAM 58, HDD persistent storage 62 or the high-speed HDD array and sent to the computing node, e.g., a virtual machine or computer system that made the request through the storage control logic 52.

Once an identifier advances based upon increased usage and is placed at the cache insertion point 74, the specific group of data for the identifier is inserted into the high-speed HDD array and the identifier is associated with the first designated subset of slots 80. And upon an identifier being moved out of the first designated subset of slots 80 to the second designated subset of slots 82, the I/O manager 54 can cause the specific group of data for the identifier is removed from the high-speed HDD array. In order to not completely discard identifiers that still may be relevant, upon an identifier that is within the third set of designated slots 84 having the usage attribute reach a predetermined threshold, e.g. have a more recent hit, increase in frequency of usage, larger diversity of calling applications, and the like, that identifier is placed at the insertion point 76 (slot N). Thus, while an identifier is held within the third set of slots 84, the identifier has the length of that set to decrement before being dropped at drop slot 78.

As embodied herein, caching occurs with an HDD array, such DRAM 58 (which could be any low-cost magnetic storage array) and a SSD array (SSD look-aside cache 60). The first designated subset of slots 80 selectively hold identifiers for data that is held within the HDD array, and a fourth designated subset of slots 86 that selectively hold identifiers for data that is held within the SSD look-aside cache 60, and the logical set of slots further including an SSD array insertion point 72 (shown as slot D), such that once the identifier is placed at HDD cache insertion point 74, the specific group of data for the identifier is placed within the HDD array (DRAM 58) and the identifier is associated with the first designated subset of slots 80, and upon an identifier being moved within the first designated subset of slots 80 to the SSD array insertion point 72, the specific group of data for the identifier is moved from the HDD array (DRAM 58) into the SSD array (SSD look-aside cache 60).

Figure 4:
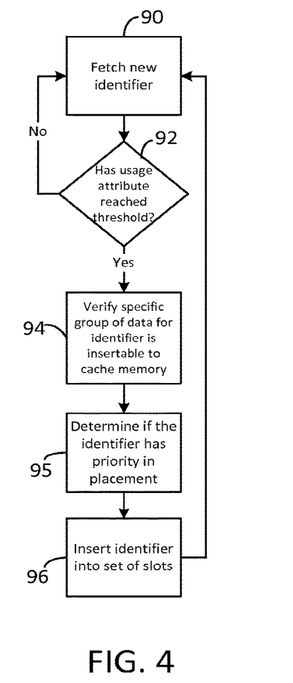
FIG. 4 is a flowchart illustrating an embodiment of a process to insert identifiers for specific groups of data into the set of slots of FIG. 3.

FIG. 4 is a flowchart illustrating an embodiment of a process to insert identifiers for specific groups of data into the set of slots of FIG. 3. This process can be carried out by the I/O manager 54 of FIG. 2, or on another device such as within storage or by an instantiated virtual machine, such as VM1. For example, the process could occur when a user decides to launch a virtual machine and the storage control logic 52 receives a large number of read requests from the booting guest operating system. A new identifier for consideration is fetched, as shown at step 90 and then a determination is made as to whether the usage attribute has reached the predetermined threshold to be placed into the set of slots 70, as shown at decision 92. The usage attribute can be data resident with the identifier or separate therefrom and simply referenced by the identifier. The predetermined threshold can be LRU, overall frequency of use, or other usage attributes. If the predetermined threshold has not been met, then process returns to fetch another identifier, as shown at step 90. If the threshold has been met at decision 92, then it is verified that the specific group of data for that identifier is insertable into cache memory, as shown at step 94, and it is determined as to whether the identifier has a priority in placement into the slots, as shown at step 95. For example, if the data for a customer is of a high priority, then the identifier may be placed in the slots at a higher point than in the insertion point. Once any priority is determined at step 95, then the identifier is inserted in the set of slots 70, at insertion point 76. The process then returns to step 90 to fetch another identifier.

It should be noted that the process shown in FIG. 4 is merely an embodiment and is used to prevent placement of all potential identifiers with the logical set of slots 70. The process described herein can begin with every identifier that has been recently used or called being placed into the set of slots 70. For example, in a specific example the frequency of use threshold can be set to 1. Thus, each identifier that I/O manager 54 processes that is not listed in the set of slots 70 can be inserted into the set of slots 70 at the insertion point 76.

Figure 5:
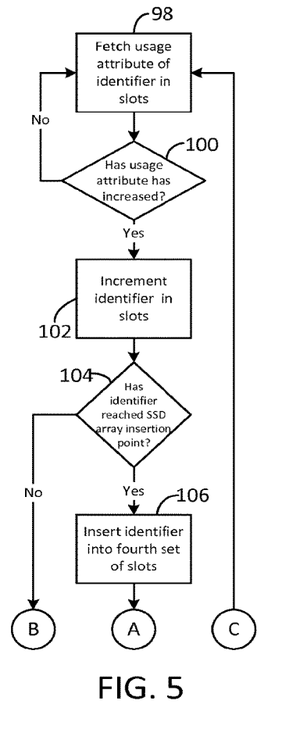
FIG. 5 is a flowchart of one embodiment of a process for moving identifiers within the set of slots and moving specific groups of data for the identifiers into and out of cache memory based upon an increase in the usage attribute of the identifier.
Figure 6:
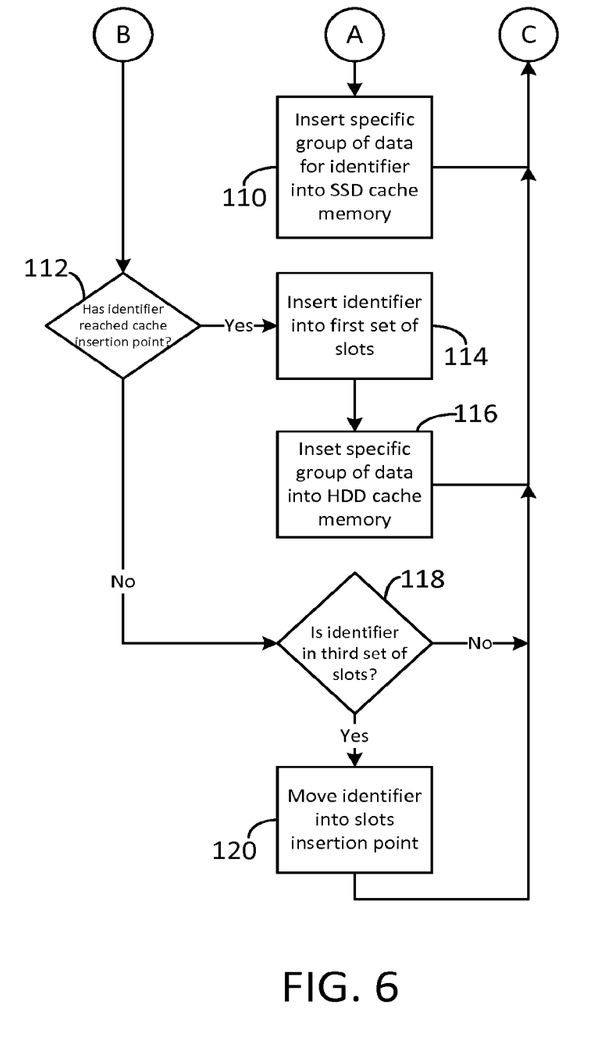
FIG. 6 is a flowchart continuing the process of FIG. 5.

FIGS. 5 and 6 illustrate a flowchart of one embodiment of a process for moving identifiers within the set of slots 70 and moving specific groups of data for the identifiers into and out of a first type of persistent storage (e.g., the HDD persistent storage 62/DRAM 58) and a second type of persistent storage (e.g., the SSD look-aside cache 60) based upon an increase in the usage attribute of the identifier. The process is typically implemented on the one or more computer devices that comprise the I/O manager 54. In response to receipt of an I/O request for data (e.g., a SCSI command indicative of a read), I/O manager 54 can identify an identifier that is associated with the data and access the usage attribute for the identifier, as shown at step 98, and a determination is made as to whether the usage attribute for the identifier has increased, as shown at decision 100. For example, in a specific embodiment the I/O manager 54 could be configured to increase the usage attribute for reads but not writes. If the usage attribute of the identifier has not increased, the process returns to fetch the usage attribute of another identifier within the array at step 98. In one embodiment, this process could be implemented in sequence on each identifier in Q to A of the slots, thus constantly iterating and rearranging the identifiers within the slots.

If the usage attribute has increased at decision 100, then the identifier is incremented in the slots as shown at step 102, and a determination is made as to whether the identifier has reached the SSD array insertion point 72, as shown at decision 104. Decision 104 is performed in the example embodiment when the logical set of slots 70 tracks an insertion point for an SSD array as shown in FIG. 3. If the identifier has reached SSD insertion point 72, then the identifier is inserted into the fourth set of slots 86 as shown at step 106 and the specific group of data for the identifier is inserted into the SSD cache memory array (such as SSD look-aside cache 60), as shown at step 110, and the process returns to fetch another usage attribute at step 98. In a specific embodiment, the identifier could be inserted into the head of the set of slots 70 and each identifier can be moved down a slot (e.g., the identifier can be moved into slot A of FIG. 3. and the identifier that was in slot A can be moved into slot B, and so on and so forth.) As such, data that has been most recently inserted into the SSD look-aside cache 60 can continue to be cached until its identifier is demoted from the fourth set of slots 86.

Otherwise, if the identifier has not reached the SSD array insertion point at decision 104, then, as illustrated by FIG. 6, a determination is made as to whether the identifier has reached the HDD cache insertion point 74, as shown at decision 112. If the identifier has reached the cache insertion point 74, then the identifier is moved into the first set of slots, as shown at step 114, and the specific group of data is inserted into the high-speed HDD cache, as shown at step 116, and the process iterates to fetch another usage attribute at step 98. It should be noted that if the cache memory were only embodied as a SSD array, without any HDD storage, then there would be only one cache insertion point, such as HDD insertion point 74, with decision 112 being the only cache insertion determination, and there would not be decision 104.

If the identifier has not reached the cache insertion point 74 at decision 112, then a determination is made as to whether the identifier is in the third set of slots 84, as shown at decision 118. If the identifier is within the third set of slots 84, then the identifier is moved to the insertion point 76 of the slots 70 as shown at step 120. After step 120, and if the identifier is not within the third set of slots at decision 118, then the process iterates to step 98 and fetches another usage attribute to begin the process. Accordingly, this updating process would consistently be iterating through the identifiers in the set of slots 70.

Figure 7:
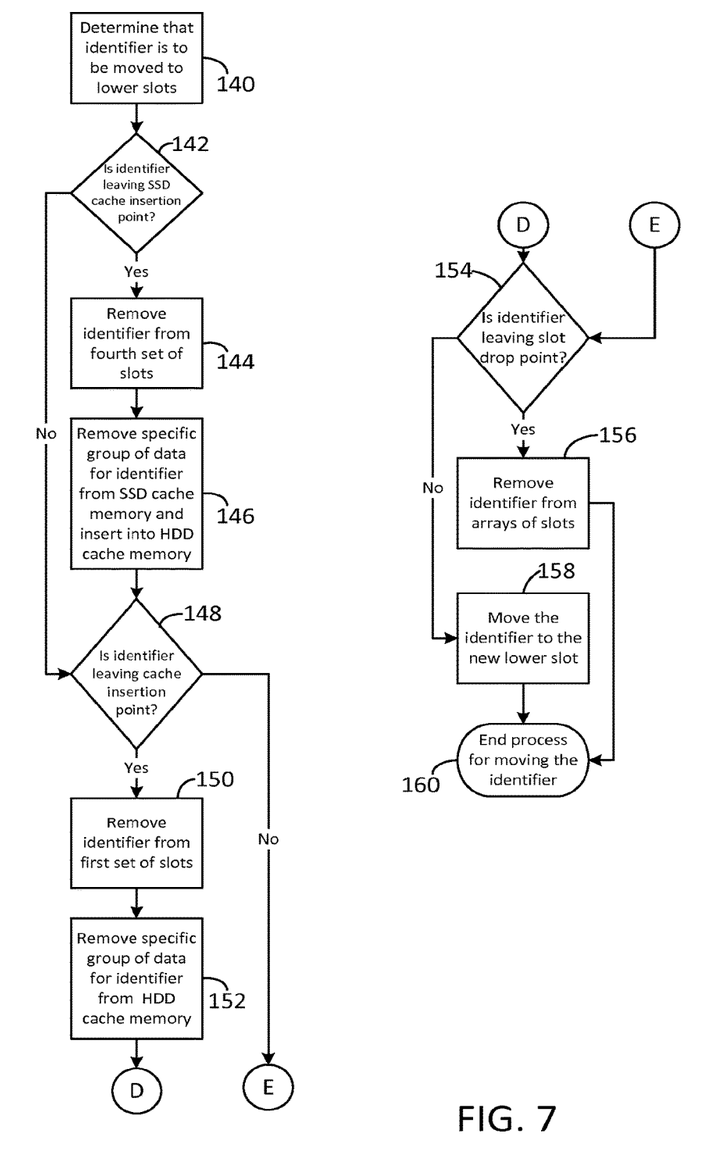
FIG. 7 is a flowchart of one embodiment of a process for moving identifiers to lower slots and moving specific groups of data for the identifiers out of cache memory or identifier out of the set of slots.

FIG. 7 is a flowchart of one embodiment of a process for moving identifiers to lower slots and moving specific groups of data for the identifiers out of cache memory or identifier out of the set of slots 70 completely. It should be noted that the process shown in FIG. 7 can be occurring in conjunction with the identifier incrementing process shown in FIGS. 5 and 6, or separately therefrom. Upon it being determined that the identifier is to be moved to a lower slot, as shown at step 140, e.g. an incrementing identifier will replace the current identifier it its slot, a determination is then made as to whether the identifier is leaving the SSD cache insertion point 72, as shown at decision 142. If the identifier is to be removed from the SSD cache insertion point 72, then the identifier is removed from the fourth set of slots 86, as shown at step 144, and, in this embodiment, the specific group of data for that identifier is moved from the SSD cache memory array (such as SSD look-aside cache 60) into the HDD cache memory array (such as DRAM 58) of the cache memory, as shown at step 146. Thus, with reference to FIG. 3, the identifier was moved from slot D to slot E.

It should be noted that, to limit the flopping of data at the SSD cache memory array insertion point 72 or HDD cache insertion point 74, a victim replacement scheme or other methodology as known in the art can be used. For example, when a first identifier is be moved from the first subset 80 to the second subset 82 of the logical set of slots 70, the move can only occur if it is based upon two other identifiers having usage attributes such that those other identifiers are to be moved into the slot of the first identifier. Other victim caching techniques can be used herein as are known in the art.

Otherwise, if the identifier is not leaving the SSD cache insertion point 72, or after the identifier and specific group of data have been moved as step 146, a determination is made as to whether the identifier is leaving the HDD cache insertion point 74, as shown at decision 148. If the identifier is leaving the HDD array insertion point 74, then the identifier is removed from the first set of slots, as shown at step 150, and the specific group of data for the identifier is removed from the HDD cache memory array, as shown at step 152, i.e. from cache memory completely. Thus, with reference to FIG. 3, the identifier that is decremented from slot H to slot I will have its corresponding data group removed from cache memory (here, DRAM 58) and the data will otherwise remain in storage, such as HDD persistent storage 62. A victim scheme can also be implemented at decision 148. It should be noted that once the identifier is removed from the slots, the data could still be placed in other caches or storage.

Otherwise, if the identifier is not leaving the HDD cache memory insertion point 74, or after the specific group of data of the identifier has been removed from cache memory at step 152, a determination is made as to whether the identifier is leaving the slot drop point 78, as shown at decision 154. If the identifier is leaving the slot drop slot 78, then the identifier is removed as shown at step 156, and the moving process terminations at termination 160. A victim scheme can also be implemented at decision 154 to prevent an identifier from dropping out of the set of slots 70. If the identifier is not leaving the set of slots 70 at decision 154, then the identifier is moved to the lower slot, as shown at step 158, and the moving process terminates, as shown at termination 160.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

What is claimed is:

1. A system, comprising:
   a processor; and
   a memory, the memory including instructions that upon execution cause the system to:
   receive a request for a first data group among a monitored set composed of a plurality of data groups that includes at least a second data group, the first data group stored in a first type of persistent storage and storable in a second type of persistent storage having a lower access time than the first type of persistent storage, wherein each data group among the plurality of data groups is associated with information indicating a frequency that specific data group is accessed;
   compare information associated with the first data group to a caching threshold for data in the monitored set, the information indicating the frequency that the first data group is accessed relative to the frequency that each data group among the plurality of data groups within the monitored set is accessed, and wherein the caching threshold is indicative of a position in an ordering of the plurality of data groups; and
   cause, based at least in part on the comparison, the first data group to be stored in the second type of persistent storage upon determining that the frequency that the first data group is accessed is greater than the frequency that the at least second data group in the other data is accessed.

2. The system of claim 1, wherein the second type of persistent storage includes the second data group, and upon the first data group being stored in the second type of persistent storage, evicting the second data group from the second type of persistent storage.

3. The system of claim 1, wherein the caching threshold is dynamic.

4. The system of claim 1, wherein the caching threshold is based upon the number of accesses to read the first data group.

5. The system of claim 1, wherein the plurality of data groups comprise a hierarchical set of slots.

6. The system of claim 5 wherein the number of slots varies in response to a variance in available storage provided by the first type of persistent storage, the second type of persistent storage, or a combination thereof.

7. The system of claim 1 wherein the memory further including instructions that upon execution cause the system to:
   cause, based at least in part on the comparison, a first identifier corresponding to the first data group to be inserted in a potential drop section of an ordered list of identifiers with each identifier corresponding to one of a plurality of data groups within the monitored set of data groups.

8. The system of claim 7, wherein the memory further including instructions that upon execution cause the system to promote the first identifier for the first data ahead of an adjacent identifier in response to receiving an access request for the first data.

9. A method comprising:
   receiving a request for first data among a monitored set of data that is potentially storable in a second type of persistent storage having a lower access time than a first type of persistent storage, the first data stored in the first type of persistent storage, wherein the monitored set of data is composed of a plurality of data groups with each specific data group being associated with information indicating a frequency that specific data group is accessed;
   comparing information associated with the first data to a caching threshold, the information indicating the frequency that the first data is accessed relative to each data group among the plurality of data groups within the monitored set of data is accessed, and wherein the caching threshold is indicative of a position in an ordering of the plurality of data groups; and
   causing, based at least in part on the comparison, the first data to be stored in the second type of persistent storage.

10. The method of claim 9, wherein the second type of persistent storage includes second data, and upon the first data being stored in the second type of persistent storage, stored second data is evicted from the second type of persistent storage.

11. The method of claim 9, wherein the caching threshold is dynamic.

12. The method of claim 9, wherein the caching threshold is based upon the number of reads of the first data.

13. The method of claim 9, wherein the first type of persistent storage is a magnetic storage device, and wherein the second type of persistent storage is a solid-state storage device.

14. The method of claim 9 further comprising causing, based at least in part on the comparison, a first identifier corresponding to the first data group to be inserted in a potential drop section of an ordered list of identifiers with each identifier corresponding to one of a plurality of data groups within the monitored set of data groups.

15. The method of claim 14, further comprising promoting the first identifier for the first data ahead of an adjacent identifier in response to receiving an access request for the first data.

16. A system comprising
at least one computing device having instructions stored thereon that upon execution:
fetch a first identifier for a first data among a monitored set of data that is storable in a second type of persistent storage, the first data stored in a first type of persistent storage having a higher access time than a second type of persistent storage, wherein the monitored set of data is composed of a plurality of data groups with each specific data group being associated with a usage indicator indicating a frequency that specific data group is accessed;
compare a first usage indicator associated with the first identifier to a predetermined threshold;
cause, based at least in part on the comparison, the first identifier to be inserted in a potential drop section of an ordered list of identifiers with each identifier corresponding to specific data groups within the monitored set of data, each specific data group stored based on where the corresponding identifier is located in the ordered list;
compare a second usage indicator associated with the first identifier to a caching threshold, the second usage indicator indicating the frequency that the first data is accessed relative to each data group among the plurality of data groups within the monitored set of data, and wherein the caching threshold is indicative of a position in the list of identifiers; and
cause, based at least in part on the comparison of the second usage indicator to the caching threshold, the first data to be stored in the second type of persistent storage.

17. The system of claim 16, wherein the at least one computing device further having instructions stored thereon that upon execution inserts the first identifier in the potential drop section results in a second identifier for a second data among the monitored set of data to be removed from the potential drop section.

18. The system of claim 16, wherein the at least one computing device further having instructions stored thereon that upon execution promote the first identifier for the first data ahead of an adjacent identifier in response to receiving an access request for the first data.

19. The system of claim 16, wherein one or more of the first usage indicator or the second usage indicator is indicative of a number of different applications requesting access to the first data.

20. The system of claim 16, wherein the second usage indicator comprises a position in the ordered list of identifiers.

* * * * *